United States Patent [19]

White et al.

[11] 4,298,166
[45] Nov. 3, 1981

[54] PORTABLE WATER DRINKING FOUNTAIN

[76] Inventors: Joe I. White, 7709 Byrum Dr.; Elton G. Hawley, 1426 Springwood La., both of Charlotte, N.C. 28210

[21] Appl. No.: 958,551

[22] Filed: Nov. 8, 1978

[51] Int. Cl.³ ............................................. E03B 9/20
[52] U.S. Cl. ..................................... 239/24; 239/201; 239/566; 137/322
[58] Field of Search ...................... 239/24, 25, 28–30, 239/201, 566; 137/322; 251/149.6

[56] References Cited

U.S. PATENT DOCUMENTS

| | | | |
|---|---|---|---|
| 1,164,940 | 12/1915 | Jackson | 239/566 |
| 1,627,219 | 5/1927 | White | 239/566 |
| 1,740,015 | 12/1929 | Hooper et al. | 281/149.6 |
| 2,034,933 | 3/1936 | Wilson | 137/322 |
| 2,948,476 | 8/1960 | Don | 239/24 |
| 3,589,615 | 6/1971 | Cummins | 239/201 |

Primary Examiner—Robert W. Saifer
Attorney, Agent, or Firm—W. Thad Adams, III

[57] ABSTRACT

A portable drinking fountain for use with an existing water supply system for irrigating land. The water supply system includes a pressurized water supply, an underground water supply conduit fluidly connected to the water supply, and at least one outlet valve fluidly connected to the conduit and projecting upwardly to the surface of the ground. The portable drinking fountain comprises coupling means for fluidly interconnecting with the outlet valve, a drinking fountain head comprising an elongate, closed-end tubular member having a plurality of spaced-apart apertures in the upper, axial walls thereof for providing a plurality of upwardly directed streams of water for drinking, and an upright tubular leg member fluidly interconnecting the drinking fountain head and the coupling means for supplying water to the fountain head and supporting the fountain head in a vertically spaced relation above the ground.

1 Claim, 4 Drawing Figures

PORTABLE WATER DRINKING FOUNTAIN

BACKGROUND OF THE INVENTION

This invention relates to a portable drinking fountain intended for use in combination with an existing irrigation water supply system. The invention is intended for use on athletic fields, golf courses, and other open areas which are provided with underground irrigation systems.

It has become common in the past ten to fifteen years to equip athletic fields, especially practice fields, golf courses and other open areas with underground irrigation systems. These irrigation systems typically comprise an underground water supply conduit which is provided at predetermined intervals with upwardly projecting outlet valves which lie substantially flush with the ground. These outlet valves are normally provided with a cover to protect the valve mechanism from trash and to eliminate the hazard of having exposed holes in an area where athletic activity is conducted. The underground water supply conduit is normally supplied with water under pressure. When desired, a sprinkler head can be inserted into the outlet valve, which outlet valve simultaneously provides a support for holding the sprinkler in an upright position, and also activates the outlet valve permitting water to flow into and through the sprinkler head.

Because of the expense of providing a separate underground system for drinking water, conventional water fountains are seldom found on athletic practice fields, golf courses and the like. It is therefore a common practice, for example during football or baseball training and practice, to carry large containers of water for drinking and paper cups to the practice field. This method of providing drinking water is very time consuming, since each cup must be filled in turn, and then perhaps refilled one or more times.

This requires considerable effort on a regular basis to insure that team members are provided with an adequate supply of water as replacement for body fluids lost through exertion or heat. The importance of providing athletes with an adequate water supply during exertion has been recently recognized as contributing greatly toward the prevention of heat exhaustion. In the past, athletes were denied fluids during practice on the belief that it caused cramps. In more recent years, athletes have been provided with electrolyte beverages in order to replace salt loss as a result of physical exertion. More recently, it has been learned that an adequate supply of cool, but not cool, water is important in preventing heat exhaustion.

SUMMARY OF THE INVENTION

Accordingly, it is an object of this invention to provide a portable drinking fountain for use with an existing irrigation water supply system.

Another object of this invention is to provide athletes with an adequate drinking water supply without the necessity of repeatedly filling and carrying to the athletic field a container of drinking water, together with paper cups and the like.

Still another object of the present invention is to provide a portable drinking fountain which can be removed when not in use to prevent theft or vandalism.

Yet another object of the invention is to provide a portable drinking fountain from which several persons can drink simultaneously; and can drink as much as is desired without the necessity of refilling drinking cups.

This and other objects and advantages of the present invention are achieved in the preferred embodiment set forth herein by using a pre-existing, conventional irrigation system. The irrigation system includes a supply of pressurized water, an underground water supply conduit having a plurality of outlet valves connected to the conduit and projecting upwardly to the surface of the ground to be irrigated. The outlet valve includes means for simultaneously receiving an irrigation sprinkler head and activating a flow of water to the sprinkler.

The portable water fountain preferably comprises coupling means for simultaneously fluidly interconnecting with the outlet valve and activating a flow of water. A drinking fountain head is provided comprising an elongate, closed-end tubular member having a plurality of spaced-apart apertures in the upper axial walls for providing upwardly directed streams of water for drinking. An upright tubular leg fluidly interconnects the drinking fountain head and the coupling means for supplying water to the fountain head and also for supporting the fountain head in vertically-spaced relation above the ground. Preferably, the tubular leg includes valve means for regulating the flow of water to the fountain head.

Preferably, the fountain head is disposed in substantially perpendicular relation to the tubular leg member intermediate its opposing closed ends in such manner that the portable water fountain forms a "T" shaped structure.

BRIEF DESCRIPTION OF THE DRAWINGS

Some of the objects of the invention having been set forth above, other objects and advantages will appear as the description of the invention proceeds, when taken in conjunction with the following drawings in which.

DESCRIPTION OF THE PREFERRED EMBODIMENT

Figure 1:
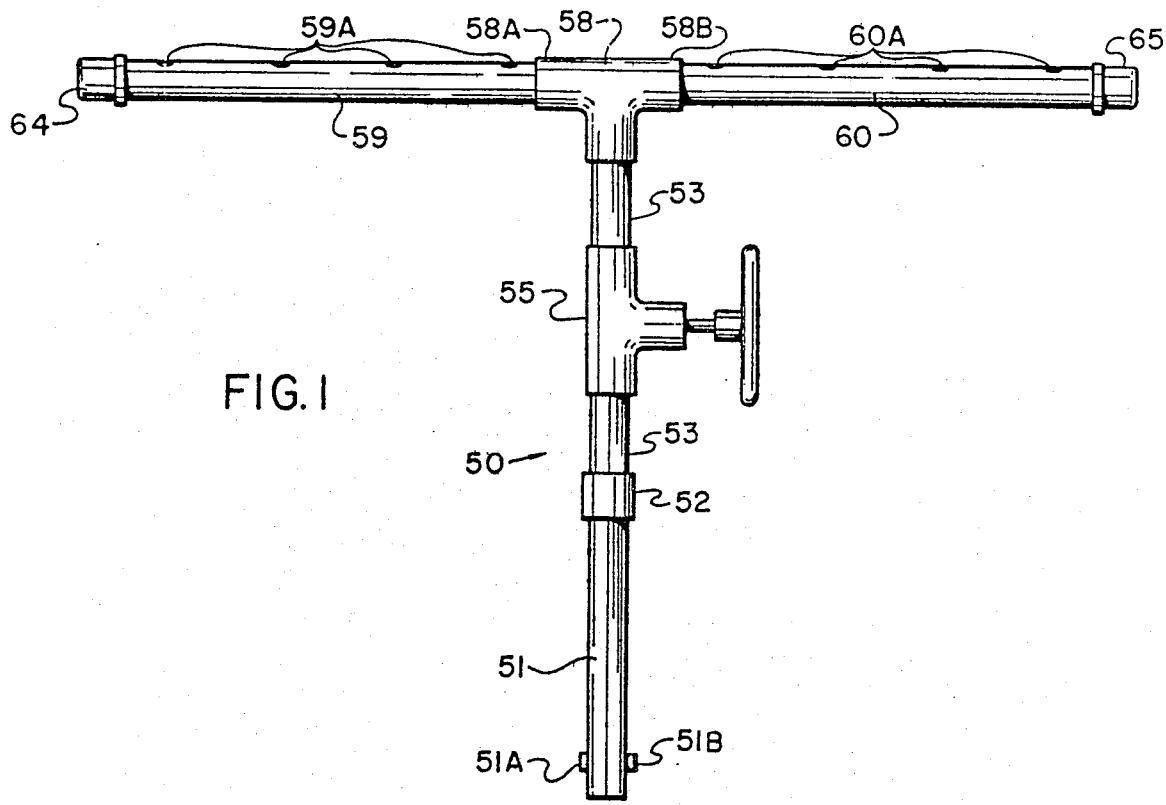
FIG. 1 is a side elevation view of the portable water fountain.
Figure 3:
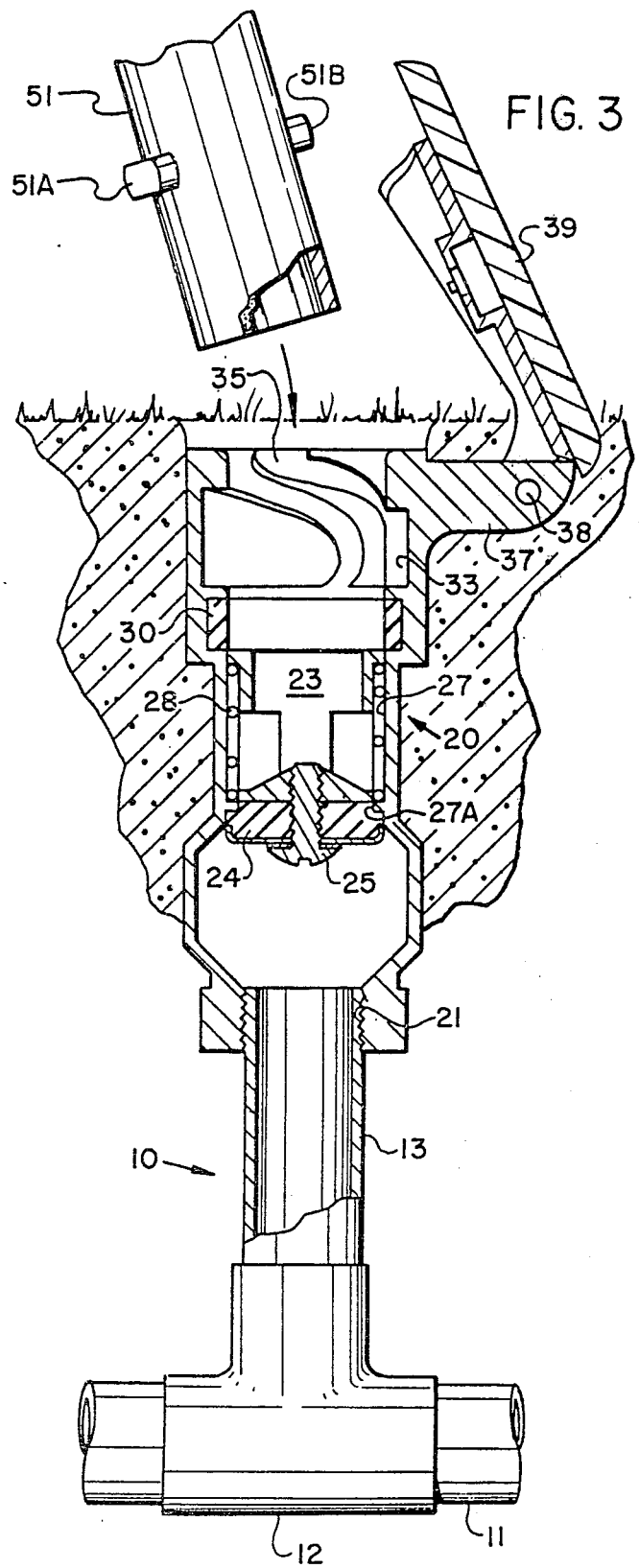
FIG. 3 is a fragmentary vertical cross section of the outlet valve of the irrigation system with which the portable water fountain is used in combination, and specifically showing the outlet valve in its closed position.

Referring now to the drawings, a portable water fountain according to the present invention is shown in FIG. 1 and broadly indicated by reference numeral 50. The portable water fountain 50 is intended to be used in combination with a water supply system broadly indicated at reference numeral 10 in FIGS. 3 and 4. The water supply system 10 includes an underground water supply conduit 11 extending longitudinally below ground level. A "T" joint 12 is fluidly interconnected with the water supply conduit 11 for directing a flow of pressurized water upwardly towards ground level. As is shown in FIG. 3, a short length of upwardly extending water pipe 13 is fluidly connected to the "T" joint 12.

Pipe 13 is provided with external threads on the outside surface adjacent the upper end thereof. An outlet valve, broadly indicated at reference numeral 20, is shown in FIG. 3 and has a threaded opening 21 for being interconnected with the water pipe 13.

The inner walls of outlet valve 20 define a central bore 27 extending longitudinally therethrough. Positioned in the bore 27 is a longitudinally extending movable valve member 23. As is best shown in FIG. 3, valve member 23 is provided with a disc-like elastomeric seal 24 on the lower end thereof for normally sealingly engaging the inner walls of the outlet valve 20. The bore 27 is provided with an annular collar 27a of reduced diameter for sealingly engaging the upper outer edge of the elastomeric seal 24. Valve member 23 is provided with a threaded screw 25 which extends through a central hole in the elastomeric seal 24 and permitting removal of the seal 24 so that it may be replaced at desired intervals. As is shown in FIG. 3, a coil spring 28 is positioned in the bore 27 closely adjacent the inner walls of the outlet valve 20. The lower end of the spring 28 rests on the upper surface of the annular collar 27a and normally urges the valve member 23 and its elastomeric seal 24 into sealing engagement with the lower surface of the annular collar 27a. The manner in which the movable valve member 23a is repositioned for fluid communication through the valve is disclosed hereinafter.

Integrally formed in the inner walls of the outlet valve 20 defining the central bore 27 are two diametrically opposed serpentine key slots 35. One of the key slots 35 is shown in FIG. 3 as being formed in the upper walls of the outlet valve 20. The key slot 35 terminates at a key seat 33 formed in the inner walls of the outlet valve 20 defining the central bore 27.

Figure 4:
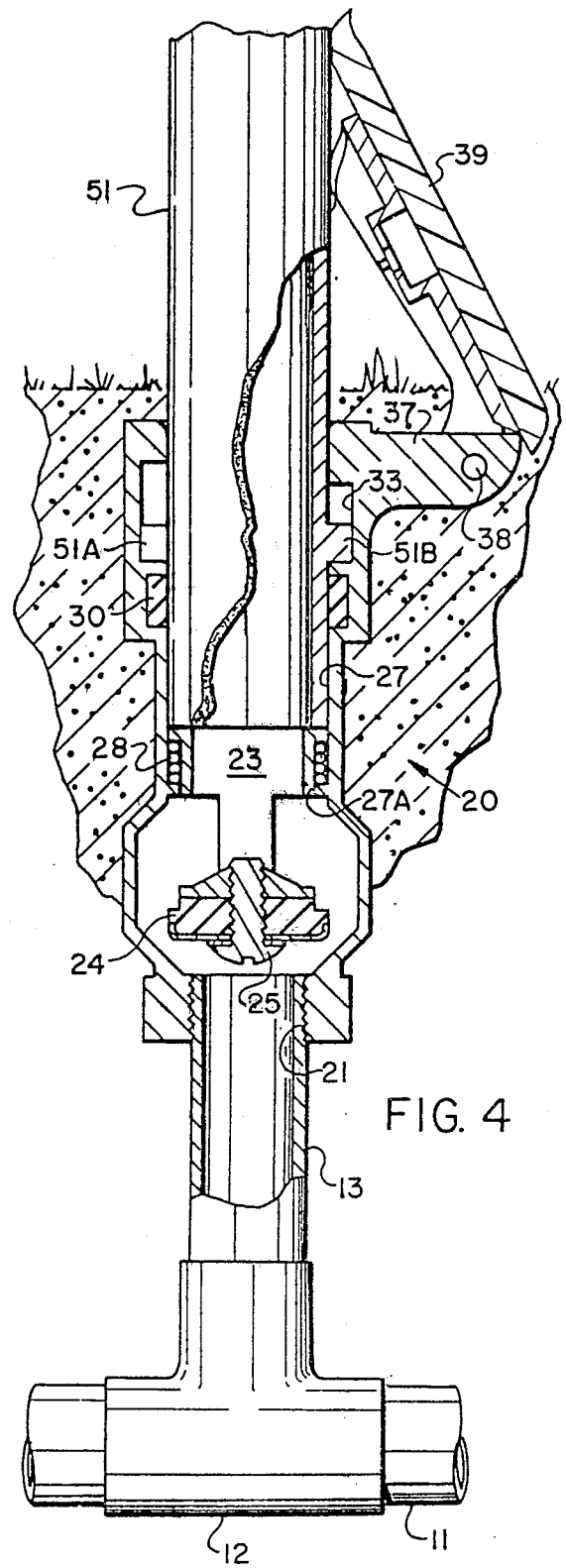
FIG. 4 is a fragmentary vertical cross section of the outlet valve of the irrigation system with which the portable water fountain is used in combination, and showing the coupling means of the portable water fountain received in the outlet valve in fluid communicating relation.

Integrally formed on the outer surface of outlet valve 20 is a cover arm 37. A cover 39 is pivotally engaged to cover arm 37 by means of pin 38. When the outlet valve 20 is not in use, cover 39 prevents trash from clogging the internal parts of the outlet valve 20. When open, the cover 39 provides additional support for the water fountain 50, as is shown in FIG. 4.

Referring now to FIG. 1, a portable water fountain according to the preferred embodiment is shown broadly at reference numeral 50. Coupling means is provided for fluidly interconnecting with the outlet valve 20. As is shown in FIG. 1, the coupling means comprises a section of pipe 51 having two diametrically opposed keys 51a and 51b fixedly secured to its outer wall in predetermined spaced-apart relation from the lower end of the pipe 51. Pipe 51 with its keys 51a and 51b is a standard fitting which is also used as a coupling means for a conventional, rotating lawn sprinkler. Fluidly connected to the pipe 51 by means of a threaded collar 52 is a tubular leg member 53. A conventional gate valve 55 is fluidly interconnected with the tubular leg member 53 for regulating the flow of water through the tubular leg member.

Figure 2:
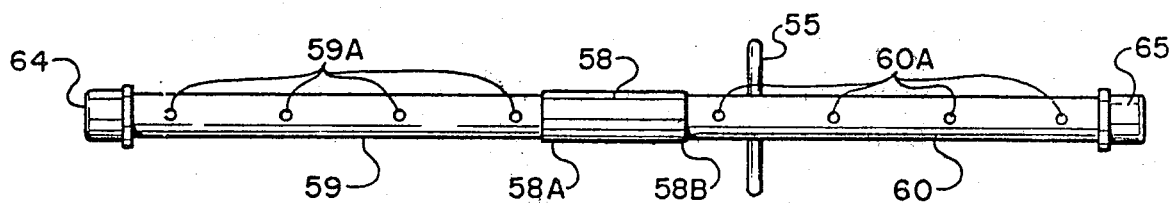
FIG. 2 is a top plan view of the portable water fountain.

Fluidly connected to the upper end of the tubular leg member 53 remote from the coupling means 51 is a "T" joint 58. Positioned for fluid communication in opposing arms 58a and 58b of the "T" joint 58 is a drinking fountain head comprising elongate, closed-end tubular members 59 and 60. As is best shown in FIG. 1, tubular members 59 and 60 are closed at their opposing free ends by threaded caps 64 and 65, respectively, of conventional design. As is best shown in FIG. 2, tubular members 59 and 60 are provided with a plurality of spaced-apart apertures 59a and 60a, respectively, in the upper axial walls thereof. These apertures 59a and 60a are each approximately one-fourth inch in diameter and provide an upwardly directed stream of water for drinking.

In its preferred embodiment, the tubular leg member 53, and the tubular members 59 and 60 comprising the fountain head are formed of one inch galvanized steel pipe. Closure caps 64 and 65, and the "T" joint 58 are conventional plumbing fixtures.

Referring again to FIG. 3, the lower end of the pipe 51 and the attached keys 51a and 51b are shown in position above the outlet valve 20. The flow of water is activated by inserting the pipe 51 into the outlet valve so that key 51b is matingly received in the serpentine key slot 35. By rotating clockwise the entire portable water fountain 50, the key 51b descends through the key slot 35 until seated in the key seat 33. Key 51a functions in a like manner in a key slot diametrically opposed to the key slot 35, not shown. Referring to FIG. 4, as the portable water fountain 50 is turned clockwise and the key 51b first descends through the key slot 35, the free end of the pipe 51 descends into the bore 27 of the outlet valve 20 and contacts the upper edge of the valve member 23. As the key 51b descends further into the key slot 35, the valve member 23 is forced downwardly against the opposite force of the spring 28 such that the elastomeric seal 24 is disengaged from sealing engagement with lower surface of annular collar 27a. In this spaced-apart relation, water is permitted to flow through the bore 27 of the outlet valve 20. When the pipe 51 is completely inserted into the bore 27 of the outflow valve 20, key 51b rests in the key seat 33 and the free end of the pipe 51 maintains the valve member 23 in such a position that water can flow around and between the elastomeric seal 24 and the annular collar 27a.

As is also shown in FIG. 4, a ring seal 30 of a suitable elastomeric material is provided encircling the bore 27 of the outlet valve 20 and resting in close sealing engagement with the pipe 51 to prevent water from flowing between the inner walls of the outlet valve 20 and the walls of the pipe 51.

In operation, it is preferable to close the gate valve 55 before connecting the water fountain 50 to the outlet valve 20. With the gate valve 55 closed, the water flows to the gate valve 55 and stops. Once the pipe 51 is completely seated in the outlet valve 20, the gate valve 55 is then opened and water is permitted to flow at a desired rate into the opposing elongate, closed end tubular members 59 and 60. By adjusting the gate valve appropriately, a stream of water of a desired height can be directed through the plurality of apertures 59a and 60a.

As is shown in FIG. 2, the apertures 59a and 60a are spaced-apart to such an extent that several persons can drink simultaneously from the fountain. Since the water flows continuously, each person may drink as much as he desires, rather than having to refill a cup.

While the preferred embodiment disclosed above has been constructed substantially of one inch galvanized steel pipe, the weight of the portable fountain can be decreased substantially by constructing the water fountain out of lightweight plumbing fixtures made of a plastic such as "PVC".

In the drawings and specification, there has been set forth a preferred embodiment of this invention. Although specific terms are employed, they are used in a generic and descriptive sense only and not for purposes of limitation—the invention being defined by the claims.

What is claimed is:

1. In a water supply system for irrigating land, having a pressurized water supply, an underground water supply conduit fluidly connected to said water supply and at least one outlet valve fluidly connected to said conduit and projecting upwardly to the surface of the ground to be irrigated, said outlet valve including means for simultaneously matingly receiving an irrigation sprinkler and activating a flow of water to said sprinkler, the combination therewith of a portable water fountain comprising:

a. coupling means for simultaneously fluidly interconnecting with said outlet valve and activating a flow of water;

b. a drinking fountain head comprising an elongated tubular member, closed at both ends and having a plurality of spaced-apart apertures in the upper axial walls thereof for providing a plurality of upwardly directed streams of water for drinking; and c. an upright tubular leg fluidly interconnecting said drinking fountain head to said coupling means at a position perpendicular thereto and intermediate its close ends for supplying water to said fountain head and supporting said fountain head in vertically spaced relation above the ground, said tubular leg including valve means for regulating the flow of water to said fountain head.

* * * * *